United States Patent [19]

Zullo et al.

[11] Patent Number: 4,481,839

[45] Date of Patent: Nov. 13, 1984

[54] MODULAR ROCKING LEVER FOR CAM MECHANISMS

[75] Inventors: Antonio Zullo, Bologna; Roberto Roffi, Casalecchio di Reno, both of Italy

[73] Assignee: Sasib S.p.A., Bologna, Italy

[21] Appl. No.: 367,789

[22] Filed: Apr. 12, 1982

[30] Foreign Application Priority Data

Apr. 23, 1981 [IT] Italy .................. 12510 A/81

[51] Int. Cl.³ .......................................... F16H 53/06
[52] U.S. Cl. ........................................ 74/569; 74/54;
74/519; 74/522.5; 29/469; 29/526 R; 172/88
[58] Field of Search ............... 74/569, 519, 522.5,
74/588, 54, 559; 29/469, 526 R; 228/182;
172/88, 95, 97, 125, 245, 248, 250

[56] References Cited

U.S. PATENT DOCUMENTS

| 988,534 | 4/1911 | Achard | 200/517 R |
|---|---|---|---|
| 1,118,411 | 11/1914 | Granz | 74/54 |
| 1,646,643 | 9/1927 | Dorsey | 74/519 |
| 1,775,635 | 4/1928 | Ball | 74/519 |
| 2,207,332 | 7/1940 | Paxton | 74/569 |
| 2,219,361 | 9/1940 | Haberstump | 74/519 |
| 2,266,081 | 12/1941 | Rogers | 74/569 |
| 2,427,395 | 8/1947 | Kellogg | 74/54 |
| 2,427,725 | 8/1947 | Hoeber | 74/54 |
| 2,484,348 | 9/1949 | Kellogg et al. | 74/569 |
| 2,799,874 | 1/1955 | Imhof | 12/10.3 |
| 2,986,949 | 11/1959 | Lancaster | 74/84 |
| 3,116,923 | 1/1964 | Günther | 74/567 X |
| 3,124,168 | 3/1964 | Wohlgemuth et al. | 74/559 |
| 3,263,512 | 8/1966 | Handley | 74/569 |
| 3,738,180 | 6/1973 | Sola | 74/53 |
| 3,946,766 | 3/1976 | Amigues | 136/66 R |
| 3,974,705 | 8/1976 | Wittkamp | 74/53 |
| 4,068,964 | 1/1978 | Stoker | 228/182 |
| 4,250,969 | 2/1981 | Orlanda | 172/97 |
| 4,356,616 | 11/1982 | Scott | 29/526 A |

FOREIGN PATENT DOCUMENTS

| 169099 | 11/1958 | Sweden | 74/54 |
|---|---|---|---|
| 274640 | 7/1927 | United Kingdom . | |
| 291232 | 5/1928 | United Kingdom . | |
| 471857 | 9/1937 | United Kingdom . | |
| 646037 | 11/1950 | United Kingdom . | |
| 748071 | 7/1980 | U.S.S.R. | 74/563 |

Primary Examiner—Alexander Grosz
Assistant Examiner—Anthony N. Raskob, Jr.
Attorney, Agent, or Firm—Spencer & Frank

[57] ABSTRACT

The rocking lever for a cam mechanism presents a hollow box-type structure and consists of a modular base piece provided with the trunnions and with the cam follower rollers adapted to cooperate with the cams. The modular base piece presents two connection surfaces, arranged at 90° with respect to each other, and adapted for the fastening of modular appendix pieces. The said modular appendix pieces can be secured in a removable and changeable manner to the modular base piece.

2 Claims, 8 Drawing Figures

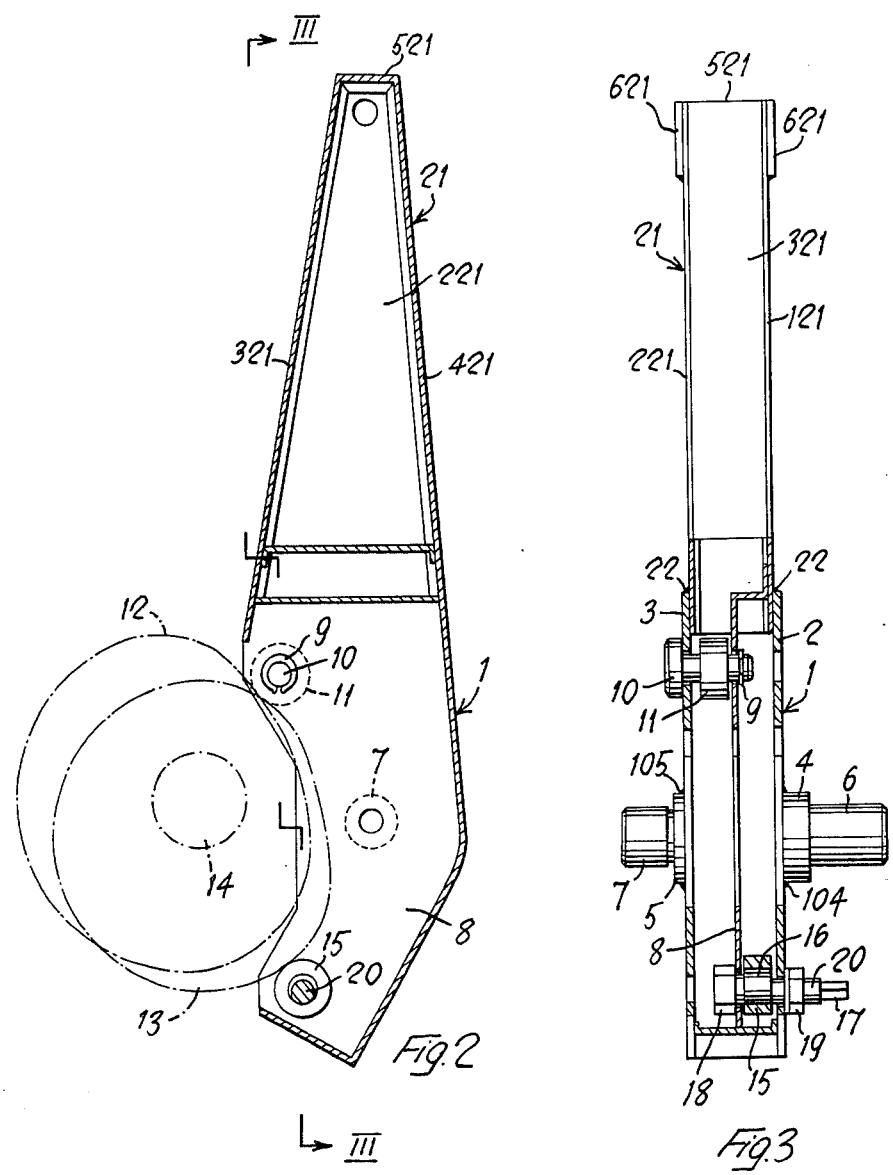

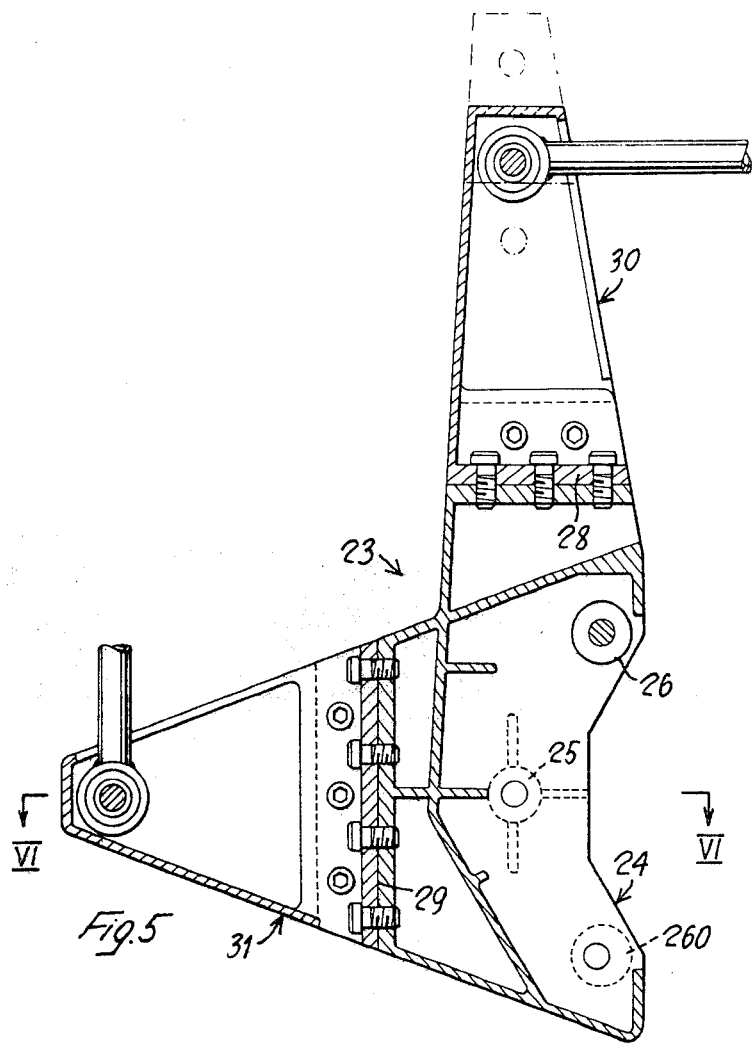
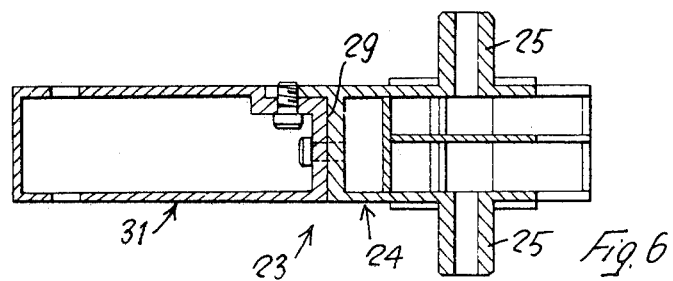

MODULAR ROCKING LEVER FOR CAM MECHANISMS

SUMMARY OF THE INVENTION

The present invention relates to a rocking lever to be used in a cam mechanism. The rocking lever according to the invention presents a hollow box-type structure, and is therefore very light in construction with consequent reduction of the inertia forces particularly in the case of high speed driving of the rocking lever. In consideration of the high number of rocking levers of different length which are employed in automatic machines (for example an automatic wrapping machine), the invention proposes a rocking lever which consists of a modular base piece, presenting the trunnions and the cam followers adapted to cooperate with the cams, and which further presents two connecting surfaces which serve for the fastening in a removable and changeable manner of modular appendix pieces which have different lengths, depending upon the desired driving ratios of the rocking lever. By fastening a modular appendix piece to each one of the connection surfaces of the modular base piece, a bell-crank lever can be obtained.

Further features and advantages of the rocking lever according to the invention will be apparent from the following detailed description of some preferred embodiments thereof.

BRIEF DESCRIPTION OF THE DRAWINGS

In the drawings:

FIG. 2 is a side section of the lever of FIG. 1.

FIG. 3 is a front section, along lines III—III, of the lever of FIG. 2.

FIG. 5 is a side section of the lever of FIG. 4.

FIG. 6 is a bottom section, along lines VI—VI, of the lever of FIG. 5.

DESCRIPTION OF THE PREFERRED EMBODIMENTS

Figure 1:
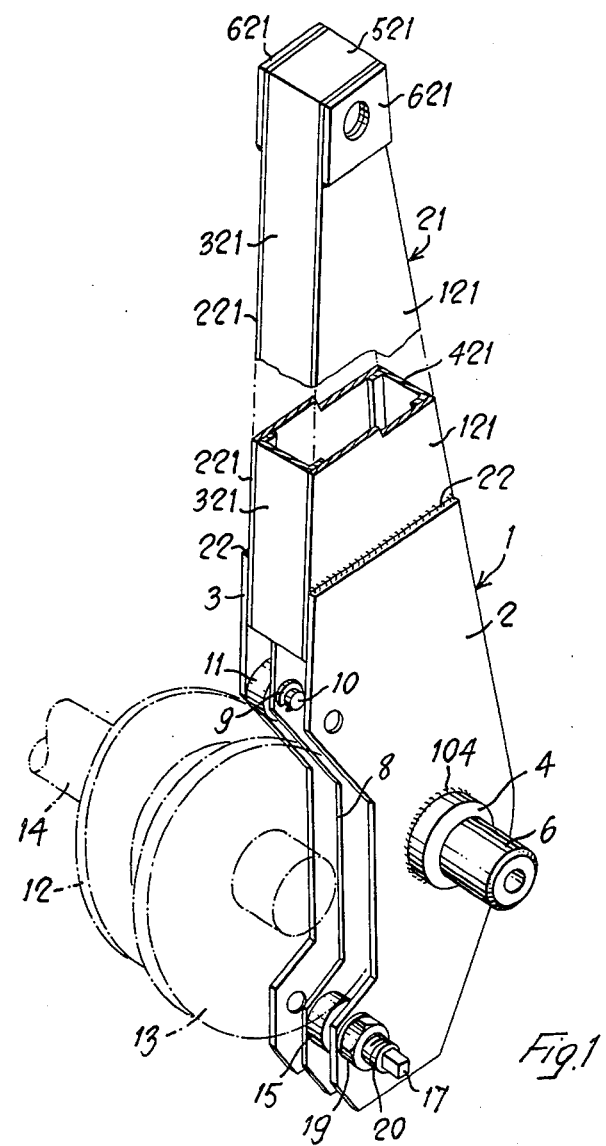
FIG. 1 is a perspective view of a rocking lever according to the invention.

With particular reference to FIGS. 1 to 3 of the attached drawings, a single piece lever 1 is shown, which presents a hollow box-type structure and is made of shaped elements of sheet metal or plate, welded together.

The modular base piece of the lever consists of a pair of cheeks 2, 3 which are arranged parallelly and spaced from each other, and to which there are welded (at 104 and 105) the hubs 4, 5 of the trunnions 6, 7 of the lever itself.

Intermediately between the cheeks 2 and 3 there is positioned the partition 8. A pin 10, provided with a head, passes through co-axial bores in the cheek 3 and in the partition 8, and is secured in place by means of the lock washer 9. On the said pin 10, between cheek 3 and partition 8, there is mounted a freely rotatable cam follower roller 11 which cooperates with the cam 12 of the pair of associated cams 12, 13 keyed on the driving shaft 14.

The other cam 13 of the pair of cams 12, 13 cooperates with the cam follower roller 15 which is mounted on the eccentric hub 16 of the adjustment pin 17 between the bolt head 18 and the lock nut 19, which is screwed on the terminal threaded portion 20 of the pin 17. By adjusting the position of roller 15, the clearance of the positive drive imparted to lever 1 by the pair of associated cams 12, 13 is also adjusted.

Between the cheeks 2 and 3 of the modular base piece there is secured the modular appendix or additional piece 21, welded at 22.

The said modular appendix piece 21 is also of box-type structure, presenting a pair of cheeks 121, 221, a pair of side walls 321, 421, a head piece 521 and a pair of terminal cheek plates 621 provided with through bores.

Referring now to FIGS. 4 to 8, a modular type lever 23 is shown, which consists of a modular base piece or body 24 presenting the trunnions 25 and the cam follower rollers 26, 260 cooperating with the pair of associated cams 27, 270. The base piece 24 presents two connection surfaces 28 and 29, forming an angle of 90° between each other, said connection surfaces serving for the fastening to the base piece of modular appendix or arm pieces 30, 31 respectively, usually of different length, to form the arms of the lever. The appendix pieces 30, 31 are secured to the base piece 24 by means of suitable screw bolts or any other fastening means of known type, and can be removed in an easy manner for substitution with identical appendix pieces (for repair purposes) or appendix pieces presenting different length (for modifying the driving ratios of the bell-crank lever thus obtained).

Figures 4, 7, 8:
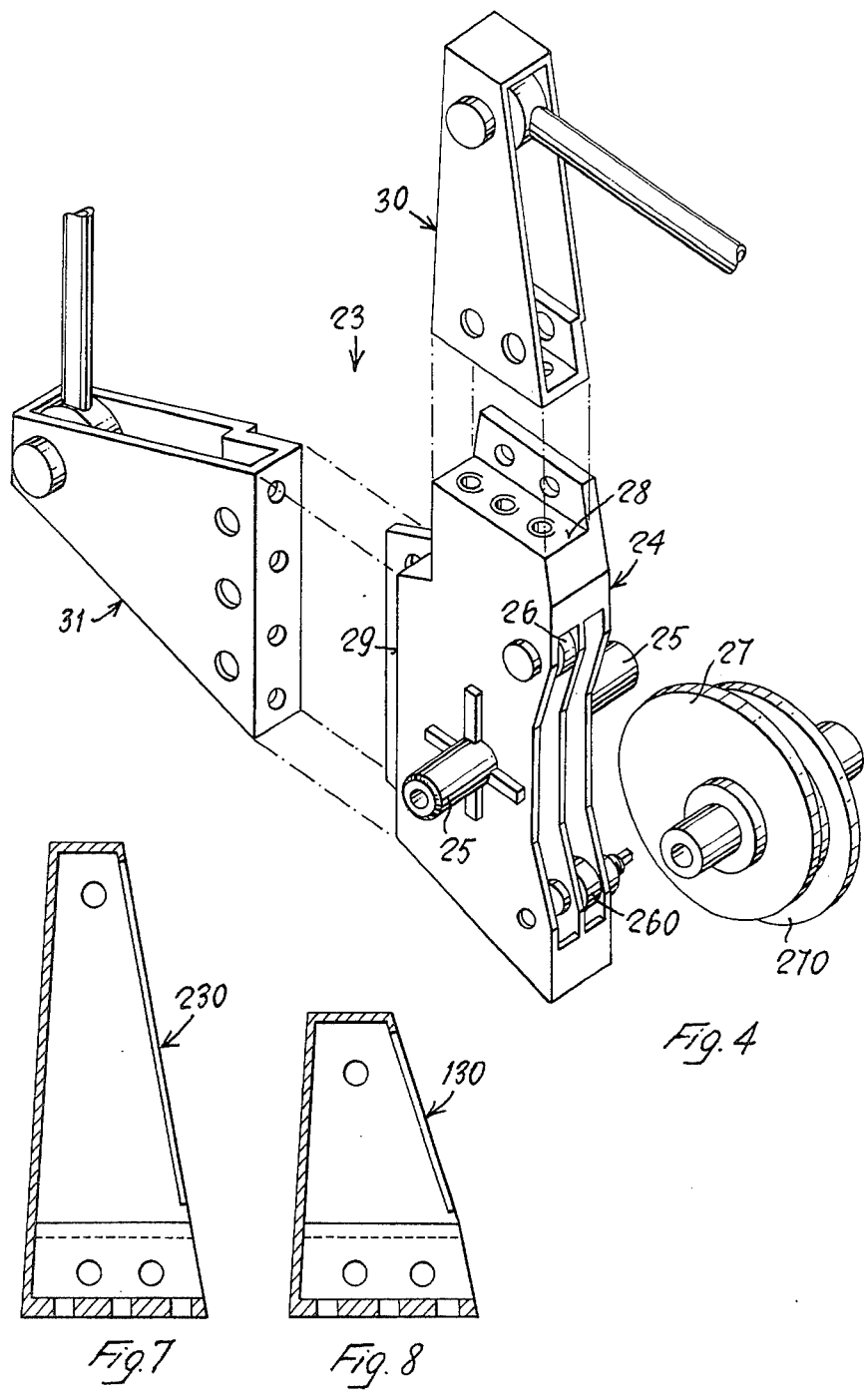
FIG. 4 is a perspective view of a further embodiment of a rocking lever according to the invention, with parts disassembled.
FIGS. 7 and 8 are side sections of further modular appendix pieces adapted to be secured to the base modular piece of the rocking lever.

Referring particularly to FIGS. 7 and 8, two appendix additional pieces 130, 230 presenting different length are precisely shown in order to illustrate the modular changeability of the said appendix pieces with respect to the piece 30 of FIG. 4. Of course, also for what concerns the appendix piece 31 there may be provided modular pieces having different length, to be secured to the base modular piece 24 in alternative to the said piece 31.

Preferably, the base modular piece 24 is obtained by pressure die-casting or precision casting, always maintaining the box-type structure, while the appendix pieces 30, 31 (130, 230) are preferably made of shaped and welded sheet metal or plate.

It is believed that the invention will have been clearly understood from the foregoing detailed description. Changes in the details of construction may be resorted to without departing from the spirit of the invention and it is be accordingly intended that no limitation be implied and that the annexed claims be given the broadest interpretation to which the employed language fairly admits.

We claim:

1. A modular rocking lever comprising in combination:

a modular base piece haing a hollow box-type structure and being provided with trunnions forming a pivot axis for said lever, and with two connecting surfaces which are perpendicular to one another and which each have at least an elongated portion which forms an edge of said base piece and whose longitudinal axis is perpendicular to said pivot axis; the edge of said base piece opposite one of said portions of said connecting surfaces is open; first and second modular appendix pieces with said appendix piece being of a desired length and having a hollow box-type structure; means for fastening said first appendix piece to one of said connecting surfaces in a removable and changeable manner to form a first arm of said lever; means for fastening said second appendix piece to the other of said connecting surfaces to form a further arm of said lever; and at least one cam follower roller rotatably mounted within said base piece adjacent said open edge.

2. A modular rocking lever comprising in combination:
 a modular base piece having a hollow box-type structure and being provided with trunnions forming a pivot axis for said lever, and with two connecting surfaces which are perpendicular to one another and which each have at least an elongated portion which forms an edge of said base piece and whose longitudinal axis is perpendicular to said pivot axis; the edge of said base piece opposite to one of said portions of said connecting surfaces is open; a modular appendix piece of a desired length and having a hollow box-type structure; means for fastening said appendix piece to one of said connecting surfaces in a removable and changeable manner to form an arm of said lever; and at least one cam follower roller mounted within said base piece adjacent said open edge.

* * * * *